Figure 1:
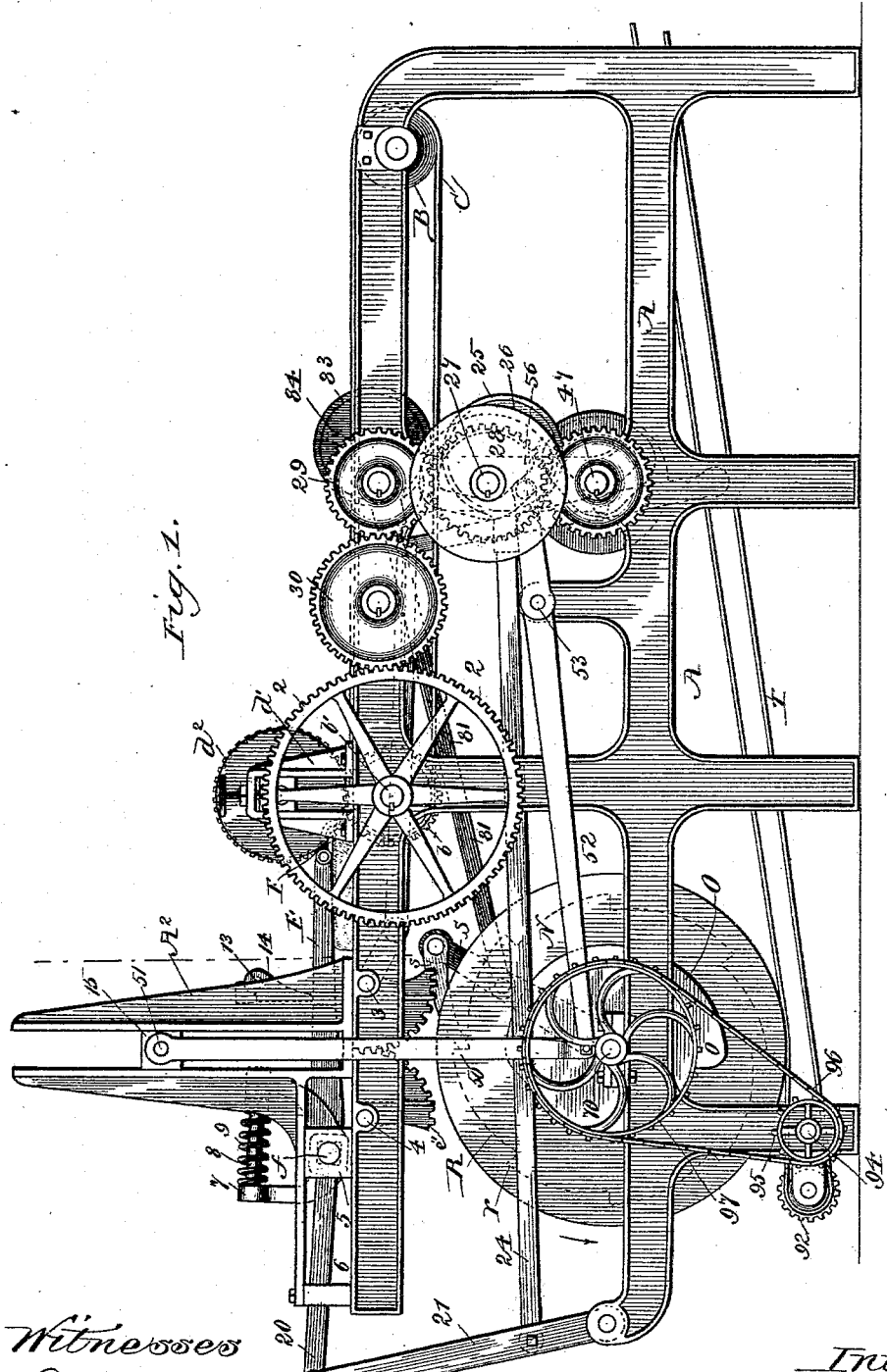

(No Model.) 3 Sheets—Sheet 1.

F. WESTERMAN.
MACHINE FOR FORMING LOAVES OF DOUGH.

No. 425,278. Patented Apr. 8, 1890.

Witnesses

Inventor
Frederick Westerman
By Prim & Fisher
His Attys.

(No Model.)  F. WESTERMAN.  3 Sheets—Sheet 2.
MACHINE FOR FORMING LOAVES OF DOUGH.

No. 425,278. Patented Apr. 8, 1890.

(No Model.) 3 Sheets—Sheet 3.

F. WESTERMAN.
MACHINE FOR FORMING LOAVES OF DOUGH.

No. 425,278. Patented Apr. 8, 1890.

Witnesses
W. Rossiter
Fredk. H. Miles

Inventor
Frederick Westerman
By Prinn & John
His Attys.

UNITED STATES PATENT OFFICE.

FREDERICK WESTERMAN, OF CHICAGO, ILLINOIS.

MACHINE FOR FORMING LOAVES OF DOUGH.

SPECIFICATION forming part of Letters Patent No. 425,278, dated April 8, 1890.

Application filed December 15, 1888. Serial No. 293,742. (No model.)

*To all whom it may concern:*

Be it known that I, FREDERICK WESTERMAN, a citizen of the United States, residing at Chicago, in the county of Cook and State of Illinois, have invented certain new and useful Improvements in Machines for Forming Loaves of Dough, of which I do declare the following to be a full, clear, and exact description, reference being had to the accompanying drawings, forming part of this specification.

In an application for Letters Patent filed by me in the United States Patent Office July 9, 1888, Serial No. 279,379, is described and claimed a new machine whereby loaves of dough are formed from previously-prepared layers or strips of dough by folding sections cut from the layers over upon themselves one or more times, in order to impart the desired shape to the loaf. In such application three forms of machines embodying my invention were described and shown, and certain generic claims pertaining to each of these forms were embraced and specific claims were made to features peculiar to one of the machines there shown.

In the present application I have included one of the forms of machines shown and described in my above-mentioned application, and have made specific claims to peculiarities of construction of said machine not specifically claimed in the above-mentioned prior application. In this application, also, I have included certain novel mechanism for delivering the loaves of dough to the receptacles wherein their folding is to be completed, and novel mechanism whereby the loaves of dough shall be removed from the receptacles after the folding has been effected.

I do not wish to be understood as claiming in this application particularly the feature of a series of movable receptacles having folding wings adapted to double or fold over the layer of dough; nor do I wish to be understood as claiming herein, broadly, the feature of a series of movable receptacles having inwardly-folding wings and a central shaft for bringing said receptacles successively into position to be filled; nor, in fact, as claiming any features of invention specifically claimed in my prior application above referred to.

My present invention consists in the novel features of construction hereinafter described, illustrated in the accompanying drawings, and specifically defined in the claims at the end of this specification.

Figure 2:
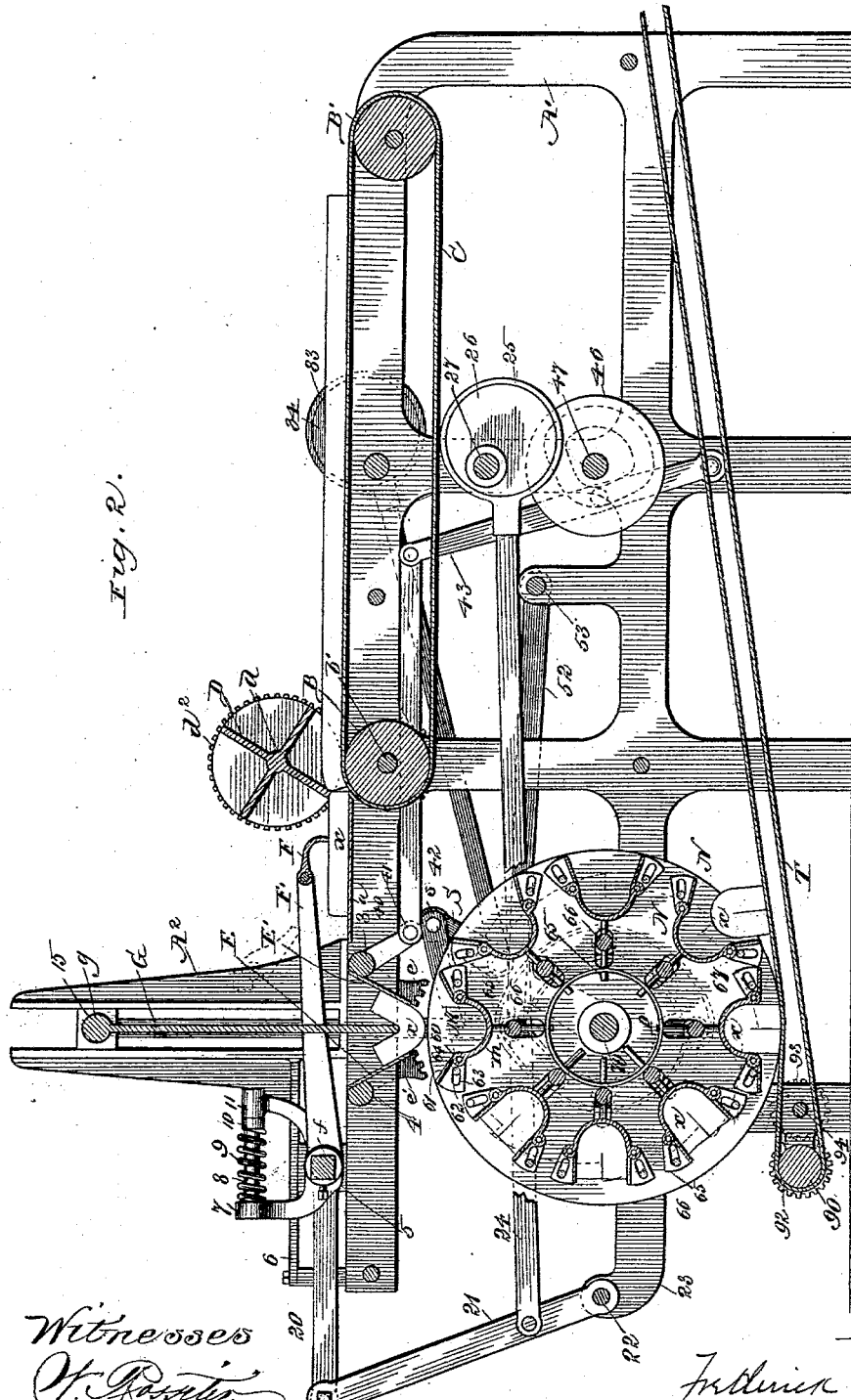
Figure 3:
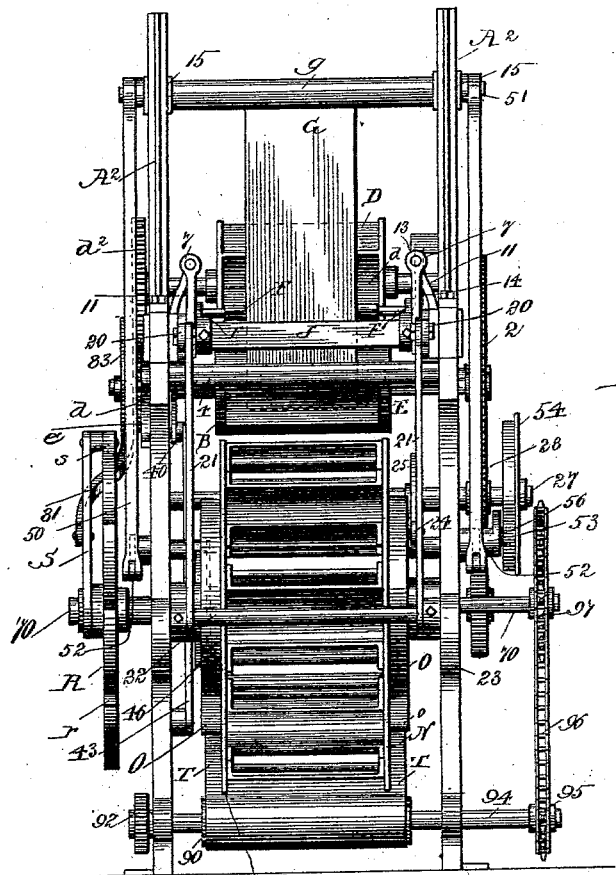
Figure 4:
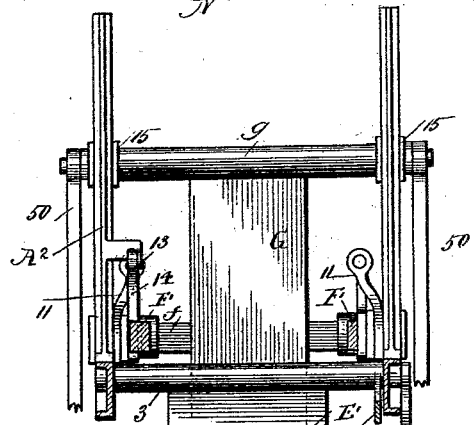

Figure 1 is a view in side elevation of a machine embodying my invention. Fig. 2 is a view in vertical longitudinal section. Fig. 3 is a view in rear end elevation. Fig. 4 is a view in vertical transverse section on the line $y$ $y$ of Fig. 1.

A and A' denote the opposite sides of the main frame of the machine.

In the upper portion of the main frame are journaled the rollers B and B', that serve to sustain the carrier-belt C, by which the previously-prepared layer or strip of dough will be fed to suitable cutting-knives D, that are carried upon a shaft $d$, journaled above the carrier-belt in suitable brackets $d'$, and receiving motion from the pinion $d^2$, that gears with the pinion $b$ upon the shaft of the roller B. A main drive-wheel 2 on the shaft $b'$ serves to impart motion to this shaft, and hence to the carrier-belt C and to the rotary cutting-knives D.

From side to side of the top rails of the main frame extends a receiving-table $a$, from which the section of dough $x$, cut from the strip or layer, will be delivered by the carrier-belt C, and from this table the sections of dough will be carried forward and delivered to the folding-receptacles by the improved mechanism next to be described.

Adjacent the rear end of the table $a$ and journaled in the top rails of the main frame are the shafts 3 and 4, that serve to carry the flaps or plates E and E', that are fixed, respectively to these shafts in such position that by the movement of the shafts these plates or flaps can be brought upon the plane of the table $a$ to receive therefrom the sections of dough, or can be turned downwardly, as seen in Fig. 1, in such manner as to permit the section of dough to be delivered between the flaps or plates and into suitable final folding-receptacles.

In order to deliver the section of dough onto the flaps or plates E and E' when these flaps are in horizontal position, I preferably employ a reciprocating delivery-blade F, that extends across the top of the machine and is fixed to the outer ends of the arms F', that are fixed to and carried by the shaft $f$, which is journaled in the boxes 5, that are mounted to slide back and forth within guideways 6 upon the top rails of the machine. To this shaft $f$, that carries the arms F' of the delivery-blade F, are fixed the arms 7, that carry at their upper ends the rods 8, whereon are held the spiral springs 9, the opposite ends of these springs bearing against the washers 10, through an opening in which the rods 9 pass, these washers being fixed to the perforated brackets 11, that are connected with and project from the sliding journal-boxes 5.

From the sides A and A' of the main frame rise the vertical standards $A^2$, and to one of these standards is pivotally connected, as at 13, the swinging dog or latch 14, this dog or latch being held in such manner that when the arms are moving toward the cutting-knives it will swing freely forward and upward, so as to permit the delivery-blade F to rise, as seen in Fig. 2, above the dough; but when the plate is moved in backward direction the dog or latch 14 will bear against one of the arms F' and assume the position shown in Fig. 1, and will consequently force the blade downward until it is in position to draw forward the section of dough. Thus by reference to Fig. 1 of the drawings it will be seen that if the parts be in the position there shown and the delivery-blade F be carried backward by the sliding boxes 5 the latch bar or dog 14, by bearing against the arm F', will hold the blade in its downward position until the section of dough is drawn by the blade onto the flaps or plates E and E', that will during the backward movement of the knife rise to a horizontal position to receive the dough. If, now, the movement of the boxes 5 and of the delivery-blade F be reversed to carry this blade into position to advance the succeeding section of dough, the forward movement of the arms F', that carry the blades F, will cause the latch or dog 14 to swing upward, and at the same time the force of the spiral spring 9, being no longer resisted by the pressure of the dog 14 and the arm F', will cause the shaft $f$ to rock, and will consequently cause the arms F' and the delivery-blade F to assume the elevated position shown in Fig. 2 of the drawings.

When a section of dough has been delivered onto the flaps or plates E and E' and one of the final folding-receptacles is immediately beneath these plates, a striking-blade or plunger G will co-operate with the movable plates E and E' in delivering the dough into the receptacle. This blade or plunger G is connected to the shaft $g$, that extends from side to side of the machine in the position shown, and is carried by vertically-reciprocating blocks 15, that move within suitable guideways in the standards $A^2$, these blocks being operated by mechanism to be presently described. The relative movements of the plates or flaps E and E' and of the striking-blade G are such that when the blade G descends upon the section of dough $x$ the plates E and E' will at the same time begin to turn downward, so that the section of dough will be given an initial fold or turn about the edge of the striking-blade without this blade compressing or mashing the dough. Thus it will be seen that when the striking blade or plunger G has descended to the position shown in Fig. 2 the plates or flaps E and E' will have turned away almost a sufficient distance to permit the partially-folded section of dough to descend into the subjacent final folding-receptacle, and as the movement of the blade or plunger G and of the plates or flaps E and E' continues it is obvious that the partially-folded section $x$ of dough will be carried down and delivered into the receptacle.

It will be readily understood that the various mechanisms next to be described, whereby the movement of the delivery-blade F, the striking-blade or plunger G, and of the plates or flaps E and E' will be so relatively timed that the dough will be first advanced onto the plates or flaps and will then be carried downward by these plates or flaps and by the striking-blade or plunger into one of the receptacles wherein the final folding of the section of dough will be effected.

In order to impart the necessary reciprocating movement to the delivery-blade F, there are connected to the boxes 5 the arms 20, the opposite ends of which are pivotally connected to the rocking bars 21, that have their lower ends pivotally fastened, as at 22, to suitable brackets 23 on the main frame. To one of these rocking bars 21 at a distance above its pivot-point 22 is pivotally connected one end of a pitman 24, the opposite end of which is fastened to the eccentric-strap 25, that encircles the eccentric 26 upon the shaft 27, this shaft receiving its rotation from a pinion 28, as seen in dotted lines in Fig. 1, that is geared to the pinions 29, 30, and 31. From this construction it will be seen that when rotation is imparted to the shaft 27 and eccentric 26 a reciprocating motion is imparted to the pitman 24 and, through the medium of the rocking bar 21, to the slide-boxes 5, and hence to the delivery-blade F.

In order to cause the plates or flaps E and E' to fold away at the proper time, I prefer to gear the shafts 3 and 4 together by means of the segmental gears $e$ and $e'$, and upon the shaft 3 is fixed a rocking arm 40, to which is pivotally connected, as at 41, the end of the link 42, the opposite end of this link being pivoted to the upper end of a rocking bar 43, the bottom of this bar being pivotally connected to the main frame of the machine. To one side of this rocking bar 43 is fastened a stud 44, as seen in dotted lines, Figs. 1 and 2, that enters a suitable cam-groove 45, formed in the side of the cam-wheel 46, that is keyed to the shaft 47. This cam-groove 45 is of such shape as to impart the proper rocking motion to the bar 43, and hence it will be seen that when movement is imparted to the bar 43 by the cam-wheel 46 the link 42 will, through the medium of the rocking arm 40, impart a partial rotation to the shaft 3, and inasmuch as this shaft is geared to the shaft 4 a like partial rotation will be imparted to the shaft 4 and to the plates or flaps E and E', causing these plates or flaps to move upward or downward at the proper time.

The proper reciprocating motion is imparted to the vertically-reciprocating slide-blocks 15, and consequently to the striker blade or plunger G, by means of the vertical arms 50, that are connected, as at 51, to the slide-blocks 15, the opposite ends of these arms being connected to the ends of the rocking levers 52, that are pivotally mounted, as at 53, at each side of the machine, and receives a vibratory motion from a cam-wheel 54, within the groove 55 of which wheel rides the stud 56, that projects from the angular end of one of the rocking levers 52. This cam-wheel 54 is fixed to the shaft 27, journaled within the sides of the main frame and driven by a pinion 28, that receives motion from the main drive-shaft through the medium of the pinions 29, 30, and 2; hence it will be seen that when rotation is imparted to the cam-wheel 54 the movement of the rocking lever 52 incident to the riding of the stud 56 within the groove of the cam-wheel will cause the vertical movement of the arms 50, and will consequently produce the necessary vertical reciprocation of the slide-blocks 15 and of the striker-blade.

As above stated, and from the relative construction above defined, it is plain that as the strip of dough is delivered by the carrier-belt C beneath the cutting-knives D it will be severed into sections $x$ of proper size to form the finished loaves, and as each cutter-blade D severs a section $x$ the delivery-blade F will be advanced by the arms F' to the position shown in Fig. 1 and will descend, as shown, until the blade is behind the section of dough, so that when the movement of the carrier-blade is reversed it will draw the section of dough across the table $a$ and onto the flaps or plates E E', which at such time will occupy a horizontal position. While the carrier-blade F is returning to engage with another section of dough, the striker-blade G will descend, and at the same instant the blades or flaps E and E' will turn away, as seen at Fig. 2, so as to partially fold the dough into proper form for delivery into the final folding-receptacles. This operation will continue as often as a receptacle is brought beneath the flaps E and E'.

The receptacles M, wherein the final folding of the dough is effected, are substantially the same in construction and mode of operation as those set forth in one of the machines illustrated in my above-mentioned application. These receptacles consist of a bottom plate $m$, preferably of curved shape, to which there are pivotally connected, as at 60, the side plates or wings 61, having at their edges flanges 62, in which are formed slots 63, through which pass the pins 64, that are affixed to the side plates N, that serve to sustain the receptacles. These side plates N are fixed upon the shaft 70, that is journaled in suitable bearings in the main frame.

To the bottom of each of the receptacles M are fixed the rods 65, that are fastened to a cross-bar 66, the ends of which ride within the camways 67, (shown by dotted lines in Fig. 2, that are fastened to plates O, bolted to the frame of the machine at the outside of each plate N, so that as the plates O N are revolved by the movement of the shaft 70 the riding of the rods 66 around the camways 67 will cause the bottom portions of the receptacles M to be moved radially in and out, thus causing the plates or wings 61 to be opened or closed, according as the position of the receptacles is shifted. To the plates N is bolted, preferably, a cylindrical plate P, through suitable openings in which project the rods 65, the rods being thus more accurately held in their movements. Motion is preferably imparted to the shaft 70, and consequently to the receptacles M, through the medium of a ratchet-wheel R, that is keyed to the shaft 70, this ratchet-wheel having teeth $r$, corresponding in number and position with the receptacles M. This ratchet-wheel R is driven by the pawl-arm S, that carries at its end the pivot-pawl $s$, this arm being suitably sustained upon the shaft 70 and receiving motion from a pitman 81, pivotally connected to the pawl-arm, and connected at its opposite end to the eccentric strap 83, that encircles the eccentric 84 on the shaft of the gear-wheel 29.

From the foregoing construction, and by particular reference to the shape of the camways 67, it will be seen that as the receptacles M are rotated by the movement of the ratchet-wheel R and shaft 70 these receptacles will be successively brought beneath the flaps or plates E and E', and will there remain an instant while the pawl $s$ is riding backward over the ratchet-wheel R into position to engage with the succeeding tooth of this wheel, and while the receptacle M is thus at rest beneath the plates E and E' these plates will fold downward, as seen in Fig. 2, and the striker-blade G will descend, carrying with it the section of dough $x$ and deliver the same into the receptacle. As the striker-blade then rises and the plates or flaps E and E' return to a horizontal position the pawl $s$ will be again moved forward and will again partially rotate the shaft 70 and move another receptacle into position to receive a section of dough. After the dough has been delivered into receptacles M the rotation of the shaft 70 will cause the movement of the filled receptacles downward, and at the same time will cause the bottom portions of the receptacles to be moved backward in such manner as to force inward the side flaps or plates 61, thus bringing the section of dough into closely-folded shape, and the side plates or flaps will thus bear upon the folded section of dough until the receptacles reach their lowest position, when the peculiar angular shape of the camway 67 will cause the bar 66, the rods 65, and the bottoms of the receptacles to move outward, which operation will also force the flaps or wings to expand and permit the folded loaf to be discharged.

Beneath the receptacles M, and mounted upon a suitable roller 90 at one end and a corresponding roller at its opposite end, is sustained a discharge-belt T, the edge portions of which bear upon the sides of the plates N, that carry the receptacles M. This discharge-belt T is preferably driven by a gear-wheel 92, that engages with a corresponding gear-wheel 93 upon a shaft 94, this shaft 94 receiving motion from a sprocket-wheel 95 and a sprocket-chain 96 from a sprocket-wheel 97 upon the shaft 70. It will thus be seen that the discharge-belt T will move in unison with the receptacles M and will carry off the folded loaves as they are discharged thereon from the receptacles.

My purpose in arranging the discharge-belt T, so that it will bear closely against the plates N, that carry the receptacles M, is not merely to insure the delivery of the folded loaves of dough in proper position onto the belt, but to secure a slight pressure of the ends of the folded sections of dough against the surface of the discharge-belt, in order to give to the folded sections of dough a square shape and insure their standing properly in the pans.

It will be readily understood that many details in the construction of the machine may be modified, and that parts of the machine may be employed without its adoption as an entirety.

Having thus described my invention, what I claim as new, and desire to secure by Letters Patent, is—

1. In a machine for forming loaves of dough, the combination, with a suitable striker for folding loaves of dough and with suitable means for temporarily sustaining the loaves of dough beneath said striker, of a suitable delivery-table and a delivery-blade for drawing the dough across said table and beneath said striker, said delivery-blade being provided with means for moving it across the path of travel of said striker, substantially as described.

2. In a machine for forming loaves of dough, the combination, with a table for sustaining the sections of dough, of a reciprocating blade F, swinging arms F', connected to said blade, shaft f, for carrying said arms, standards 7, springs 8, rods 9, and arms 11, in suitable connection with said arms F', substantially as described.

3. In a machine for forming loaves of dough, the combination of suitable movable plates or sections to receive the dough, of a striker-blade for co-operating with said movable plates or sections in folding the dough, substantially as described.

4. In a machine for forming loaves of dough, the combination, with suitable pivoted plates or flaps, of a vertically-reciprocating striker-blade arranged above the said plates or flaps and serving to force the sections of dough downward between said plates or flaps, and suitable means for operating said striker, substantially as described.

5. In a machine for forming loaves of dough, the combination, with suitable movable plates or flaps E and E', geared together, and a vertically-reciprocating striker-blade or plunger G, arranged above said plates or flaps and geared to move in unison therewith, and suitable means for operating said striker, substantially as described.

6. In a machine for forming loaves of dough, the combination, with suitable plates or flaps and means for bringing said plates or flaps into a horizontal position, of a delivery-blade F, for advancing the sections of dough onto said plates or flaps, and a suitable striker-blade G, for co-operating with said plates or flaps in partially folding the dough, substantially as described.

7. In a machine for forming loaves of dough, the combination, with a series of movable receptacles, of means for delivering the dough into said receptacles, comprising suitable movable plates or flaps, and a striker-blade and means for operating said blade, substantially as described.

8. In a machine for forming loaves of dough, a receptacle for shaping the loaf, having a movable bottom portion and folding sides, substantially as described.

9. In a machine for forming loaves of dough, the combination of a rotary frame, and a series of receptacles for folding the loaves, sustained by said frame, said receptacles having movable bottoms and having folding sides, substantially as described.

10. In a machine for forming loaves of dough, the combination of a rotary frame, a series of receptacles for folding the loaves, sustained by said frame, said receptacles having movable bottoms and folding sides, and suitable guides for said sides, substantially as described.

11. In a machine for forming loaves of dough, the combination, with a rotary frame, of a series of receptacles movably sustained with respect to said frame, said receptacles having concave bottoms and movable sides, whereby a section of dough can be folded into U shape, substantially as described.

12. In a machine for forming loaves of dough, the combination, with a rotary frame, of a series of receptacles for folding the loaves of dough, sustained by said frame, said receptacles having movable bottoms and folding sides, and suitable rods connected with said bottoms for moving the same in radial direction, substantially as described.

13. In a machine for forming loaves of dough, the combination of a rotary frame, a series of receptacles for folding the loaves, sustained by said frame, said receptacles having movable bottoms and folding sides, suitable bars connected with said bottoms for imparting movement to said bottoms, and camways for operating said bars, substantially as described.

14. In a machine for forming loaves of dough, the combination of a rotary frame, a series of receptacles for folding the loaves, sustained by said frames, said receptacles having movable bottoms and folding sides, and a discharge-belt located beneath said rotary frame and in immediate proximity thereto, substantially as described.

FREDERICK WESTERMAN.

Witnesses:
GEO. P. FISHER, Jr.
T. B. CARPENTER.